(12) United States Patent
Wehner et al.

(10) Patent No.: US 6,280,335 B1
(45) Date of Patent: Aug. 28, 2001

(54) UNIVERSAL JOINT

(75) Inventors: Robert J. Wehner, Rochester Hills; Thomas J. Oldenburg, Swartz Creek; Donald J. Kurecka; Salvatore N. Grupido, both of Rochester Hills, all of MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

(21) Appl. No.: 09/496,255

(22) Filed: Feb. 1, 2000

(51) Int. Cl.$^7$ .................................................. F16D 3/16
(52) U.S. Cl. ............................................ 464/130; 411/517
(58) Field of Search ................................ 464/112, 130, 464/134, 136; 403/326; 411/516, 517, 518, 519

(56) References Cited

U.S. PATENT DOCUMENTS

| | | |
|---|---|---|
| Re. 18,144 | 8/1931 | Heiermann . |
| 2,512,690 | 6/1950 | Smith et al. . |
| 2,865,076 | 12/1958 | Newton et al. . |
| 2,950,132 * | 8/1960 | Kocsuta .......................... 411/518 X |
| 3,062,026 | 11/1962 | Pitner . |
| 3,145,547 | 8/1964 | Lyons . |
| 3,178,907 | 4/1965 | Lyons . |
| 3,986,238 | 10/1976 | Fisher . |
| 3,987,697 | 10/1976 | Wurzel . |
| 4,000,628 | 1/1977 | Funatani et al. . |
| 4,047,396 * | 9/1977 | McElwain et al. .............. 464/130 X |
| 4,310,206 | 1/1982 | Weible . |
| 4,343,581 | 8/1982 | Millheiser . |
| 4,540,386 * | 9/1985 | Kampf ................................. 464/130 |
| 4,704,782 | 11/1987 | Spiess et al. . |
| 4,911,726 | 3/1990 | Warkentin . |
| 4,943,262 * | 7/1990 | Schultze ........................... 464/136 X |
| 5,085,548 | 2/1992 | Moyles . |
| 5,399,053 | 3/1995 | Duran . |
| 5,681,060 | 10/1997 | Berg et al. . |
| 5,725,431 | 3/1998 | Myers et al. . |
| 5,758,909 | 6/1998 | Dole . |
| 6,162,126 * | 12/2000 | Barrett et al. .................... 464/136 X |

FOREIGN PATENT DOCUMENTS

| | | | |
|---|---|---|---|
| 906105 * | 9/1962 | (GB) | ................................... 464/130 |
| 92240 * | 10/1959 | (NL) | ................................... 411/518 |

\* cited by examiner

Primary Examiner—Lynne H. Browne
Assistant Examiner—Greg Binda
(74) Attorney, Agent, or Firm—Harness, Dickey & Pierce, P.L.C.

(57) ABSTRACT

A universal joint includes a yoke with a leg having an aperture extending therethrough. The aperture includes an annular groove. The universal joint also includes a cruciform having a trunion, a bearing cup positioned in the aperture and mounted on the trunion and a retention member including an outer ring having a first surface and a second surface. The retention member further includes a spring tab axially extending beyond the first surface and disposed within the aperture such that the spring tab biasedly engages the bearing cup. The second surface of the retention member is at least partially disposed within the groove.

7 Claims, 2 Drawing Sheets

UNIVERSAL JOINT

BACKGROUND OF THE INVENTION

1. Technical Field

The present invention generally relates to a universal joint for use in a driveline of a motor vehicle. More specifically, the present invention pertains to a universal joint equipped with a retention member for securing a bearing cup in a yoke.

2. Discussion

As is commonly known, universal joints are used in motor vehicle driveline applications for interconnecting a pair of rotary shafts and permitting changes in angularity therebetween. Many conventional universal joints include a pair of bifurcated yokes which are secured to the rotary shafts. The bifurcated yokes are interconnected by a spider or a cruciform for rotation about independent axes. The spider includes four orthogonal trunions with each opposing pair of axially aligned trunions mounted in a pair of aligned bores formed in the bifurcated yokes. Typically, a bearing cup is secured in each bore and a bearing assembly is retained in the bearing cup such that each yoke is supported for pivotal movement relative to one of the pairs of trunions.

Various retention methods have been developed for securing the bearing cups to the yokes in a manner wherein the rotary axis of each yoke is aligned centrally with respect to the rotary axis of the spider. Traditional bearing cup retention methods include the use of grooves, belleville washers, and snap rings. However, this method has one or more disadvantages such as, for example, excessive machining requirements, limited serviceability, and high cost of manufacture. In particular, one type of conventional universal joint utilizes a planar snap ring seated in a circumferential groove machined into the bore formed in the yokes for axially retaining the bearing cups. However, due to the dimensional variation of each component, excess clearance between the bearing cup and the snap ring is accumulated to assure assembly. Accordingly, a belleville washer is disposed between the bearing cup and the snap ring to preload the bearing and also center the cruciform within the yoke.

Other universal joint retention devices attempt to compensate for the dimensional variation in the components but sacrifice serviceability. Several examples of bearing cup retention arrangements and methods associated with conventional universal joints are disclosed in U.S. Pat. Nos. 3,062,026, 3,178,907 and 4,000,628.

SUMMARY OF THE INVENTION

Accordingly, the present invention is directed to overcoming the disadvantages commonly associated with the manufacture and subsequent service of conventional universal joints. Therefore, it is an object of the present invention to reduce the number of components and cost required to construct an easily serviceable universal joint assembly.

The present invention is directed to a universal joint for interconnecting a pair of rotating shafts. The universal joint includes a yoke with a leg having an aperture extending therethrough. The aperture includes an annular groove. The universal joint also includes a cruciform having a trunion, a bearing cup positioned in the aperture and mounted on the trunion and a retention member including an outer ring having a first surface and a second surface. The retention member further includes a spring tab axially extending beyond the first surface and disposed within the aperture such that the spring tab biasedly engages the bearing cup. The second surface of the retention member is at least partially disposed within the groove.

Further areas of applicability of the present invention will become apparent from the detailed description provided herein after. It should be understood however that the detailed description and specific examples, while indicating preferred embodiments of the invention, are intended for purposes of illustration only since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

In general, the present invention is directed to a universal joint of the type used in motor vehicle driveline applications for interconnecting rotating shafts in a manner permitting changes in angularity therebetween.

Figures 1, 2:
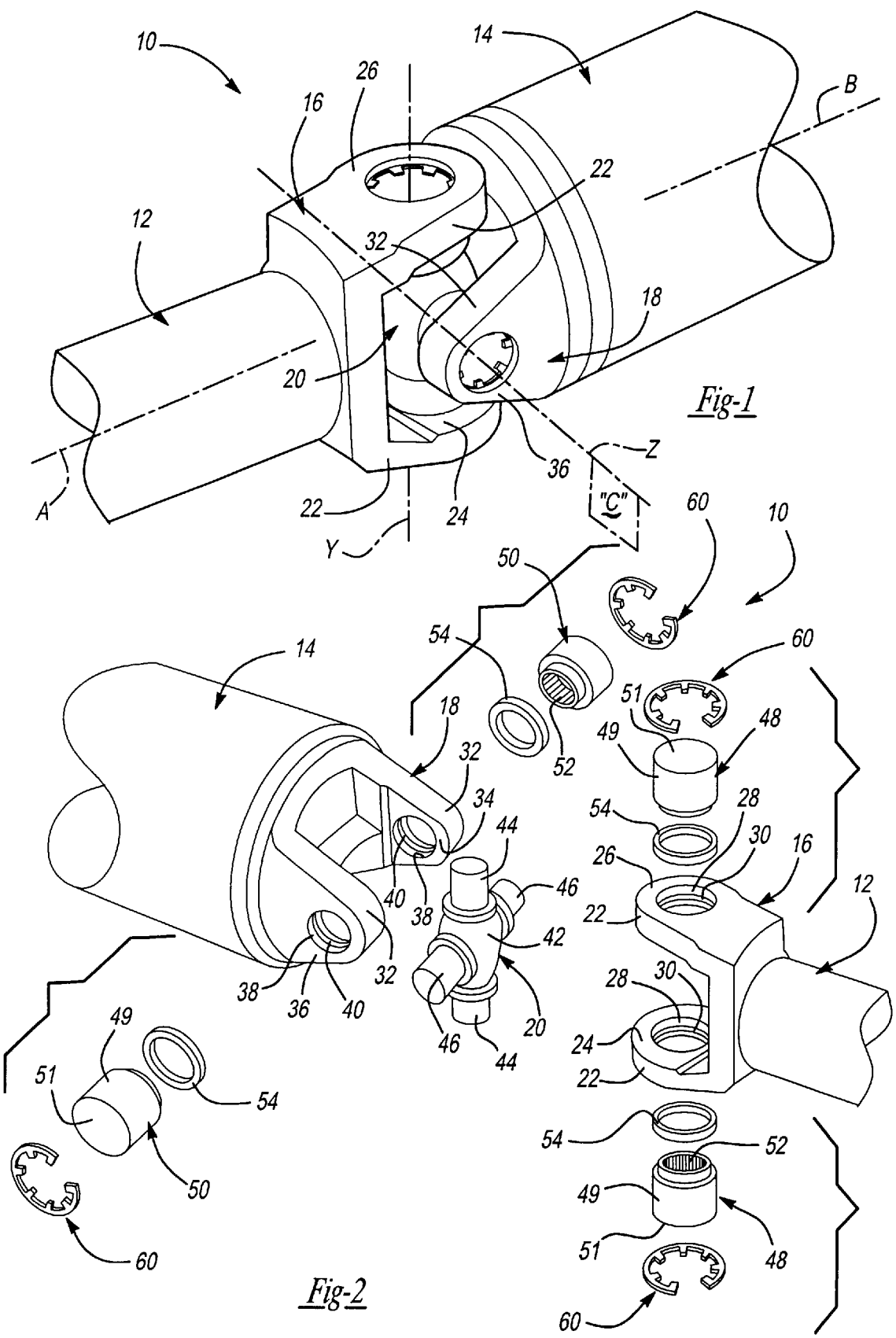
FIG. 1 is a perspective view of a universal joint according to the principals of the present invention.
FIG. 2 is an exploded perspective view of the universal joint shown in FIG. 1.

Referring to FIGS. 1 and 2, a universal joint 10 is shown connecting a first 15 shaft 12 to a second shaft 14. In general, universal joint 10 includes a first yoke 16 attached to an end of first shaft 12, a second yoke 18 attached to an end of second shaft 14 and a cruciform 20 interconnecting first yoke 16 to second yoke 18. The first yoke 16 is bifurcated and includes a pair of laterally-spaced legs 22 which are preferably symmetrical with respect to the rotary axis of first shaft 12, as denoted by construction line "A". Legs 22 include an inboard surface 24 and an outboard surface 26 with an aperture 28 extending therebetween. Apertures 28 are aligned on a first trunnion axis, as denoted by construction line "Y", which passes through and is orthogonal with respect to rotary axis "A" of first shaft 12. Each aperture 28 is a throughbore and includes an annular ring groove 30 positioned between the inboard surface 24 and the outboard surface 26.

Second yoke 18 is bifurcated and includes a pair of laterally-spaced legs 32 which are preferably symmetrical with respect to the rotary axis of second shaft 14, as denoted by construction line "B". Legs 32 include an inboard surface 34 and an outboard surface 36 with an aperture 38 extending therebetween. Apertures 38 are saligned on a second trunnion axis, as denoted by construction line "Z", which passes through and is orthogonal with respect to rotary axis "B" of second shaft 14. Apertures 38 are throughbores which include an annular groove 40 formed between the inboard surface 34 and the outboard surface 36. It should be noted that the shape and dimensions of apertures 28 and 38 may either be identical or different depending on the particular dimensions of cruciform 20 used therewith. It should is also be noted that the annular ring grooves 30 and 40 may be formed by machining, casting or by similar technique.

As best seen in FIG. 2, cruciform 20 includes a central hub 42 from which a pair of first trunions 44 and a pair of second trunions 46 extend. First trunions 44 are orthogonal with respect to second trunions 46. First trunions 44 are adapted for insertion into apertures 28 in legs 22 of first yoke 16 so as to be axially aligned on first trunnion axis "Y". Similarly, second trunions 46 are adapted to be inserted into apertures 38 in legs 32 of second yoke 18 so as to be axially aligned on second trunnion axis "Z". With first trunions 44 and second trunions 46 installed in first and second yokes 16 and 18, respectfully, trunnion axes "Y" and "Z" pass through a common plane which orthogonally intersects the rotary axis of cruciform 20, shown in FIG. 1 by construction plane "C". Universal joint 10 also includes a first pair of bearing cups 48 adapted to be mounted in apertures 28 and a second pair of bearing cups 50 adapted to be mounted in apertures 38. First bearing cups 48 are provided for receiving and rotatably supporting first trunions 44 in apertures 28. Similarly, second bearing cups 50 are provided for receiving and rotatably supporting second trunions 46 in apertures 38. As seen, bearing cups 48 and 50 each include a tubular sleeve segment 49 enclosed by an end segment 51. A roller bearing assembly 52 is mounted in the sleeve segment for rotatably supporting trunions 44 and 46 therein. In addition, annular elastomeric seals 54 are mounted on trunions 44 and 46, respectively, for providing a sealed relationship with respect to the open end of the sleeve segments 49 of bearing cups 48 and 50, respectively.

Figure 3:
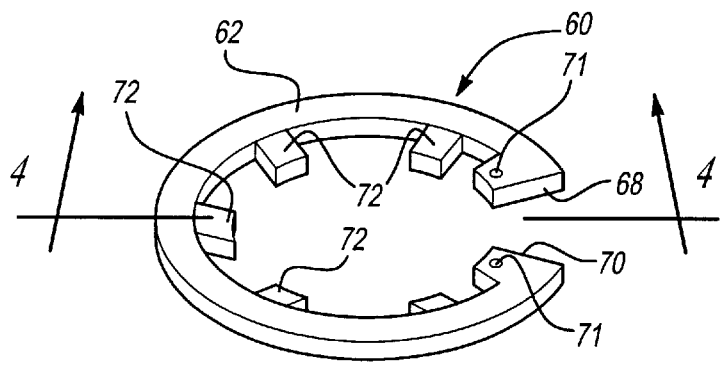
FIG. 3 is a perspective view of the retention member according to the principals of the present invention.

To assemble the universal joint 10, one of the bearing cups 48 is mounted on one of the first trunions 44 prior to insertion thereof into its corresponding aperture 28 such that the terminal end surface of the trunnion is placed in abutting engagement with the end segment 51 of its corresponding bearing cup. Alternatively, trunions 44 and 46 may be installed into corresponding apertures 28 and 38 with bearing cups 48 and 50 thereafter installed into apertures 28 and 38. For purposes of describing the cruciform alignment and retention device used in association with yokes 16 and 18, reference is now directed to FIGS. 3, 4 and 5. However, while the following disclosure is specifically directed to retention of cruciform 20 relative to first yoke 16, it is to be understood that a similar process is contemplated for use with second yoke 18.

Once rotary axis "A" of first shaft 12 is co-axially aligned with rotary axis "B" of second shaft 14, a retention member 60 cooperates with each bearing cup 48 to retain the aforementioned components in relation to each other. In reference to FIG. 3, the retention member 60 includes a generally planar, "C" shaped outer ring 62 having a top surface 64 and a bottom surface 66. The outer ring terminates at first and second ends 68 and 70, respectively, and includes apertures 71 extending therethrough to facilitate installation of retention member 60 as described in greater detail hereinafter.

Figure 4:
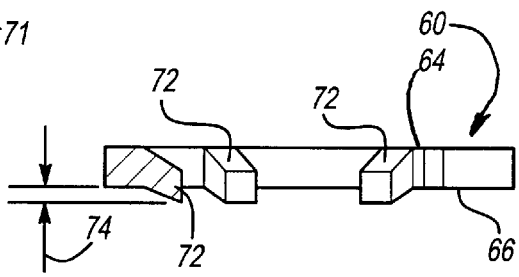
FIG. 4 is a sectional view of the retention member shown in FIG. 3.
Figure 5:
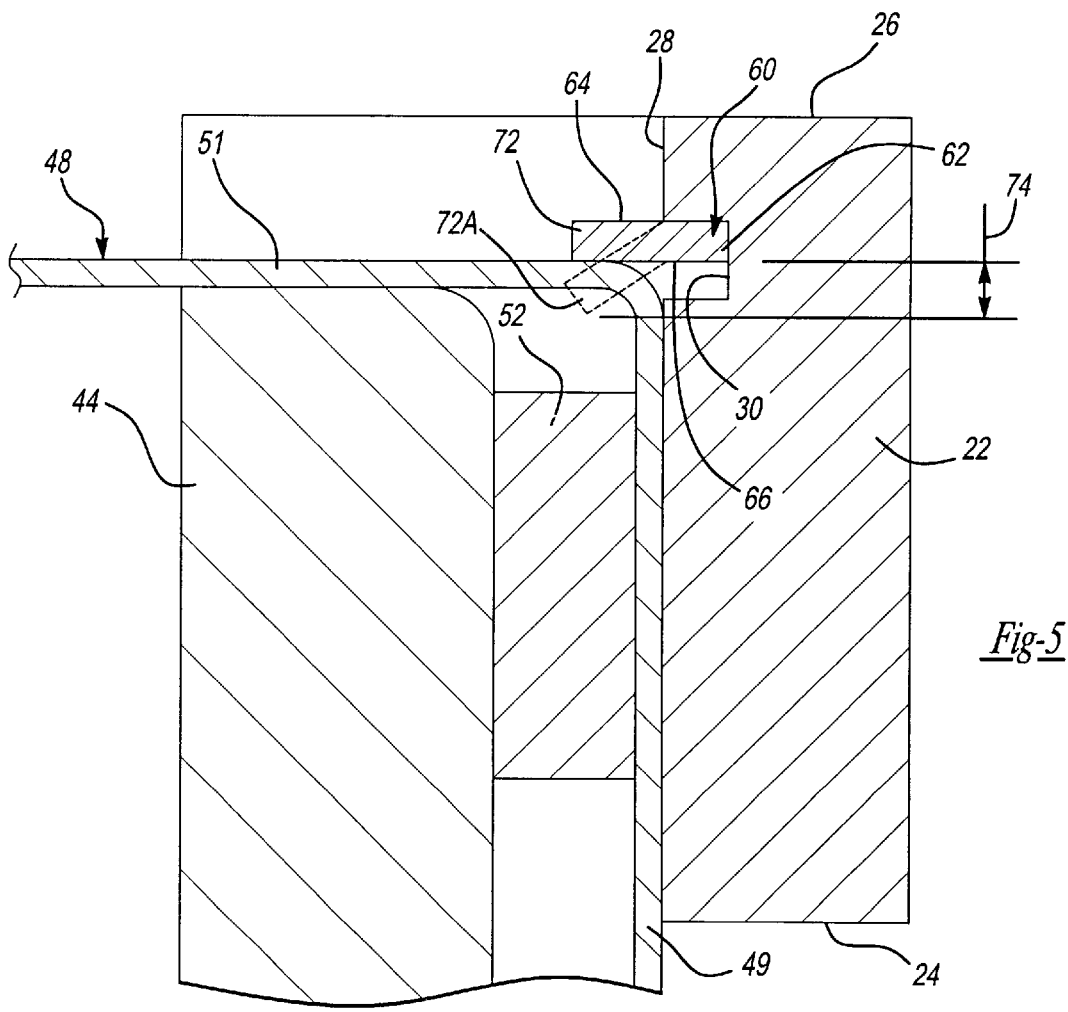
FIG. 5 is a partial sectional view of one of the yokes associated with the universal joint shown in FIGS. 1 and 2.

As best seen in FIGS. 4 and 5, retention member 60 further includes a plurality of radially directed and convergent spring tabs 72 extending a distance 74 beyond the plane defined by bottom surface 66 of outer ring 62. In order to provide resistance to permanent deformation during operation, the retention member 60 is preferably constructed from a resilient material such as spring steel. Furthermore, one skilled in the art will appreciate that a singular spring tab 72 may be used instead of the plurality depicted in the drawings without departing from the scope of the present invention. It should also be appreciated that while the preferred embodiment depicts the spring tab 72 as a generally rectangular, planar element, other geometrical designs are contemplated as being within the scope of the present invention.

Referring to FIG. 5, universal joint 10 of the present invention is presented in an assembled state. Preferably, retention member 60 is installed by reducing the outer diameter of outer ring 62 with a tool (not shown) acting in cooperation with apertures 71 and disposing retention member 60 within aperture 28. Retention member 60 is inserted within aperture 28 until spring tabs 72 are axially compressed and biasedly engaged with end segment 51 of bearing cup 48. After retention member 60 is positioned adjacent ring groove 30, the tool is released and outer ring 62 expands into ring groove 30. One skilled in the art will appreciate that the spring tab is depicted in broken line representation as element 72A to illustrate the spring tab orientation prior to engagement with end segment 51 of bearing cup 48 and in solid line format as element 72 when in the deflected, installed state. One skilled in the art will further appreciate that, prior to installation, spring tabs 72A extend distance 74 in order to compensate for the "stack-up" or summation of component tolerances described earlier. Accordingly, care is taken to assure that distance 74 is great enough to not only account for component variation but also to impart a beneficial preload on the bearing cups.

Therefore, it should be appreciated that the configuration and operation of universal joint 10 provides both manufacturing and functional advantages over the prior art. Specifically, the universal joint 10 of the present invention utilizes a retention member to minimize component count, thereby easing assembly and reducing the cost of manufacture.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. A universal joint comprising:
    a yoke including a leg having an aperture extending therethrough, said aperture including an annular groove;
    a cruciform having a trunion;
    a bearing cup mounted on said trunion, said bearing cup positioned in said aperture; and
    a retention member including an outer ring having a first surface and a second surface, said outer ring disposed in said groove and further including a spring tab axially extending beyond said first surface such that said spring tab being deflected to biasedly engage said bearing cup and wherein said second surface of said outer ring is at least partially disposed in said groove.

2. The universal joint of claim 1 wherein said retention member includes a plurality of convergent spring tabs radially extending from said outer ring.

3. The universal joint of claim 1 wherein said bearing cup includes a sleeve segment and an end segment and wherein said spring tab biasedly engages said end segment of said bearing cup.

4. A universal joint comprising:

a first yoke adapted to be rotated about a first rotary axis, said first yoke including a pair of first legs each having a first throughbore including a first annular groove therein;

a second yoke adapted to be rotated about a second rotary axis, said second yoke including a pair of second legs each having a second throughbore including a second annular groove therein;

a cruciform having a pair of first trunions and a pair of second trunions;

a pair of first bearing cups mounted on said first trunions and positioned in said first throughbores;

a pair of second bearing cups mounted on said second trunions and positioned in said second throughbores; and retention members positioned in said first and second annular grooves wherein each of said retention members includes an outer ring and a radially and axially extending spring tab being deflected for biasedly engaging said first and second bearing cups;

wherein said rotary axis of said first yoke is aligned with respect to said rotary axis of said second yoke.

5. The universal joint of claim 4 wherein said spring tab biasedly engages an end segment of said first and second bearing cups.

6. The universal joint of claim 5 wherein said retention member includes a plurality of spring tabs radially and convergently extending from said outer ring.

7. The universal joint of claim 6 wherein said spring tabs axially extend a predetermined distance beyond a plane defined by a first surface to account for component dimensional variability.

* * * * *